United States Patent
Henry et al.

(10) Patent No.: US 10,179,369 B2
(45) Date of Patent: Jan. 15, 2019

(54) WELDING SYSTEM FOR AC WELDING WITH REDUCED SPATTER

(71) Applicant: Lincoln Global, Inc., City of Industry, CA (US)

(72) Inventors: Judah B. Henry, Geneva, OH (US); James E. Hearn, Brunswick, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 541 days.

(21) Appl. No.: 14/923,541

(22) Filed: Oct. 27, 2015

(65) Prior Publication Data
US 2017/0113293 A1 Apr. 27, 2017

(51) Int. Cl.
*B23K 9/10* (2006.01)
*B23K 9/09* (2006.01)

(52) U.S. Cl.
CPC .............. *B23K 9/1043* (2013.01); *B23K 9/09* (2013.01); *B23K 9/091* (2013.01); *B23K 9/092* (2013.01)

(58) Field of Classification Search
CPC .......... B23K 9/09; B23K 9/091; B23K 9/092; B23K 9/093; B23K 9/0953; B23K 9/1062; B23K 9/1043
USPC .................................................... 219/130.1
See application file for complete search history.

(56) References Cited

U.S. PATENT DOCUMENTS

| | | |
|---|---|---|
| 3,657,724 A | 4/1972 | Feeley |
| 3,775,585 A | 11/1973 | Okada |
| 4,544,826 A | 10/1985 | Nakanishi |
| 4,954,691 A | 9/1990 | Parks |
| 4,972,064 A | 11/1990 | Stava |
| 5,001,326 A | 3/1991 | Stava |
| 5,003,154 A | 3/1991 | Parks |
| 5,148,001 A | 9/1992 | Stava |
| 6,034,350 A | 3/2000 | Heraly |
| 6,051,810 A | 4/2000 | Stava |
| 6,093,906 A | 7/2000 | Nicholson et al. |
| 6,172,333 B1 | 1/2001 | Stava |
| 6,215,100 B1 | 4/2001 | Stava |
| 6,384,373 B1 | 5/2002 | Schwartz |
| 6,441,342 B1 | 8/2002 | Hsu |
| 6,501,049 B2 | 12/2002 | Stava |
| 6,600,135 B2 | 7/2003 | Tong |
| 6,730,875 B2 | 5/2004 | Hsu |
| 6,833,529 B2 | 12/2004 | Ueyama |

(Continued)

OTHER PUBLICATIONS

A. Joseph, D. Farson, D. Harwig & R. Richardson: Influence of GMAW-P Current Waveforms on Heat Input and Weld Bead Shape, Jun. 1, 2005.

(Continued)

*Primary Examiner* — Brian W Jennison

(57) ABSTRACT

A welding system comprises a welding power source that provides an alternating current in a selected wave form having a set of positive and negative portions, the negative portion consisting of a peak, tailout, and background phase, and the positive portion consisting of a peak, tailout, and background; wherein the power source provides an upward ramping current during the pinch and detachment phase, switches to an electrode negative current during the negative peak, tailout, and background phases, and switches to a subsequent electrode positive portion; wherein, the positive portion may repeat prior to the next shorting event.

12 Claims, 7 Drawing Sheets

(56) References Cited

U.S. PATENT DOCUMENTS

| | | |
|---|---|---|
| 7,064,290 B2 | 6/2006 | Blankenship |
| 7,217,904 B2 | 5/2007 | Blankenship |
| 7,919,728 B2 | 4/2011 | Era |
| 8,067,714 B2 | 11/2011 | Era |
| 8,680,431 B2 | 3/2014 | Stava |
| 8,901,454 B2 | 12/2014 | Nakagawa et al. |
| 8,937,267 B2 | 1/2015 | Peters |
| 8,969,764 B2 | 3/2015 | Peters |
| 2004/0074884 A1 | 4/2004 | Butler |
| 2004/0079740 A1 | 4/2004 | Myers |
| 2005/0051524 A1 | 3/2005 | Blankenship |
| 2005/0211747 A1 | 9/2005 | Wang |
| 2005/0269297 A1 | 12/2005 | Buda |
| 2006/0070983 A1 | 4/2006 | Narayanan |
| 2007/0051712 A1 | 3/2007 | Kooken |
| 2007/0056944 A1 | 3/2007 | Artelsmair |
| 2007/0164007 A1 | 7/2007 | Peters |
| 2008/0083714 A1 | 4/2008 | Kamath |
| 2008/0264923 A1 | 10/2008 | White |
| 2009/0026188 A1 | 1/2009 | Schorghuber |
| 2009/0114631 A1 | 5/2009 | Chevalier et al. |
| 2009/0166344 A1 | 7/2009 | Hamalainen et al. |
| 2011/0114615 A1 | 5/2011 | Daniel |
| 2011/0278273 A1 | 11/2011 | Hirota |
| 2012/0097655 A1 | 4/2012 | Daniel |
| 2012/0118865 A1 | 5/2012 | Stava |
| 2013/0015170 A1* | 1/2013 | Peters .................... B23K 9/092 219/130.21 |
| 2013/0153557 A1 | 6/2013 | Pagano et al. |
| 2013/0264323 A1 | 10/2013 | Daniel |
| 2014/0083987 A1* | 3/2014 | Dodge ................. B23K 9/1043 219/130.1 |
| 2014/0263241 A1 | 9/2014 | Henry et al. |
| 2014/0263242 A1 | 9/2014 | Peters et al. |

OTHER PUBLICATIONS

Andrew Paul Joseph: Assessing the Effects of GMAW-Pulse Parameters on ARC Power and Weld Heat Input, The Ohio State University, 2001.

* cited by examiner

WELDING SYSTEM FOR AC WELDING WITH REDUCED SPATTER

TECHNICAL FIELD

Certain embodiments relate to electric arc welding. More particularly, certain embodiments relate to system for alternating current (AC) welding with reduced spatter. Most particularly, certain embodiments relate to a welding system including a power source that provides an alternating current in a selected wave form having plural phases, where wave form provides an electrode positive pinch current and detachment phases, a subsequent negative polarity peak, tailout, and background phase, and switches to an electrode positive phase prior to the next shorting event.

BRIEF SUMMARY

One embodiment of the present welding system comprises a welding power source that provides an alternating current in a selected wave form having a set of positive and negative portions, the negative portion consisting of a peak, tailout, and background phase, and the positive portion consisting of a peak, tailout, and background; wherein the power source provides an upward ramping current during the pinch phase, switches to an electrode negative current during the negative portion consisting of peak, tailout, and background phases, and switches to a subsequent electrode positive portion; wherein, the positive portion may repeat prior to the next shorting event.

According to another embodiment of the system, the wave form is a surface tension transfer wave form.

According to another embodiment of the system, the wave form is a GMAW wave form.

According to another embodiment of the system, the welding power source includes a waveform generator adapted to provide the selected wave form, wherein the wave form generator is adapted to detect an end of a short circuit (i.e. necking) condition based on at least one of dv/dt, impedance, or timer based on a predictive model wherein the power source switches to the electrode negative current upon detection of the end of the short circuit.

According to another embodiment of the system, the welding power source provides the pinch current as electrode positive.

According to another embodiment of the system, the wave form includes a detachment phase, and wherein the welding power source reignites an arc during the detachment phase with an electrode positive current. According to a further embodiment of the system, after the detachment phase, the wave form switches to an electrode negative current adapted to produce a jet force adapted to push a distal end of the electrode away from a weld puddle.

According to another embodiment of the system, the wave form further includes a background phase and wet in phase before the pinch phase, wherein the background phase and wet in phase are electrode positive, the background phase being at a higher amperage than the wet in phase.

According to another embodiment of the system, the welding power source provides a current from about 20 amps to about 40 amps during the wet in phase.

According to another embodiment of the system, during the negative polarity background phase, the welding power source provides a current in the range of about 40 to 80 amps.

According to another embodiment of the system, during the positive polarity background phase, the welding power source provides a current in the range of about 40 to 80 amps.

According to another embodiment of the system, during the negative polarity peak current phase, the welding power source provides a current in the range of about 150 to 350 amps.

According to another embodiment of the system, the welding power source provides a root mean square (RMS) current in the range of about 50 to 300 amps.

According to another embodiment of the system, each of the one or more pulses has a duration in the range of about 0.5 to 2 milliseconds.

According to another embodiment of the system, the negative portion occurs after the pinch phase and is separated from the pinch phase by a detachment phase.

According to another embodiment of the system, the negative tailout phase includes progressively decreasing electrode negative current.

According to another embodiment of the system, the welder power source includes a controller in communication with a state function generator, a digital signal processor in communication with the state function generator, an inverter in communication with the digital signal processor, wherein the inverter is electrically connected to a power source, a switching circuit and a current reducer.

According to a further embodiment of the system, the switching circuit is an H-bridge polarity switch.

According to another further embodiment of the system, the state function generator is electrically connected to at least one of the torch and the workpiece to receive voltage or current feedback therefrom.

Another embodiment of the present welding system comprises a welding power source adapted to provide an alternating current in a selected wave form to an electrode; wherein the electrode is consumable and wherein the wave form includes one or more phases during which the electrode produces a molten droplet at an exposed end thereof, wherein a short between the electrode and the workpiece occurs as the molten droplet detaches from the electrode; the welding power source being adapted to detect the short and provide an electrode negative peak current to the electrode following the transfer of the molten droplet to the workpiece; wherein the welding power source generates a jet force that pushes a puddle formed by the molten droplet toward the workpiece.

According to another embodiment, the wave form is a surface tension transfer wave form.

In accordance with an embodiment of the present invention, the arc welding process may be a gas metal arc welding (GMAW) process using, for example, argon and $CO_2$ as shielding gases, or $CO_2$ by itself. The welding electrode may include steel or stainless steel. In accordance with an embodiment of the present invention, the background current level may be about 70 amps, the peak current level may be about 330 amps, and the intermediate current level may be about 210 amps. In accordance with an embodiment of the present invention, the pre-defined pulse rate of the heat-increasing current pulses may be about 333 Hz and a wire feed speed of the arc welding process may be about 150 inches per minute.

According to a further embodiment, a welding system for performing an arc welding process by generating an electric welding waveform to produce a series of electric arc pulses between an advancing welding electrode and a metal workpiece, said system includes a first configuration of electronic components to generate an alternating current, the first configuration of electronic components providing the alternating current in a background current phase, a peak current phase, and a tail-out current phase of said electric welding waveform, wherein said background current phase provides a background current level, said peak current phase provides a peak current level, and said tail-out current phase provides a decreasing tail-out current level; a second configuration of electronic components to generate a pinch current phase of said electric welding waveform, wherein said pinch current phase provides an increasing pinch current level; and a third configuration of electronic components to decrease a current level of said electric welding waveform below said background current level at an end of said background current phase in response to said electrode shorting to said workpiece, wherein said third configuration of electronic components applies an electrode positive current to reignite the arc after said electrode shorting; and wherein said first configuration of electronic components provides an electrode negative current during the peak current phase.

These and other features of the claimed invention, as well as details of illustrated embodiments thereof, will be more fully understood from the following description and drawings.

DETAILED DESCRIPTION

Figure 1:
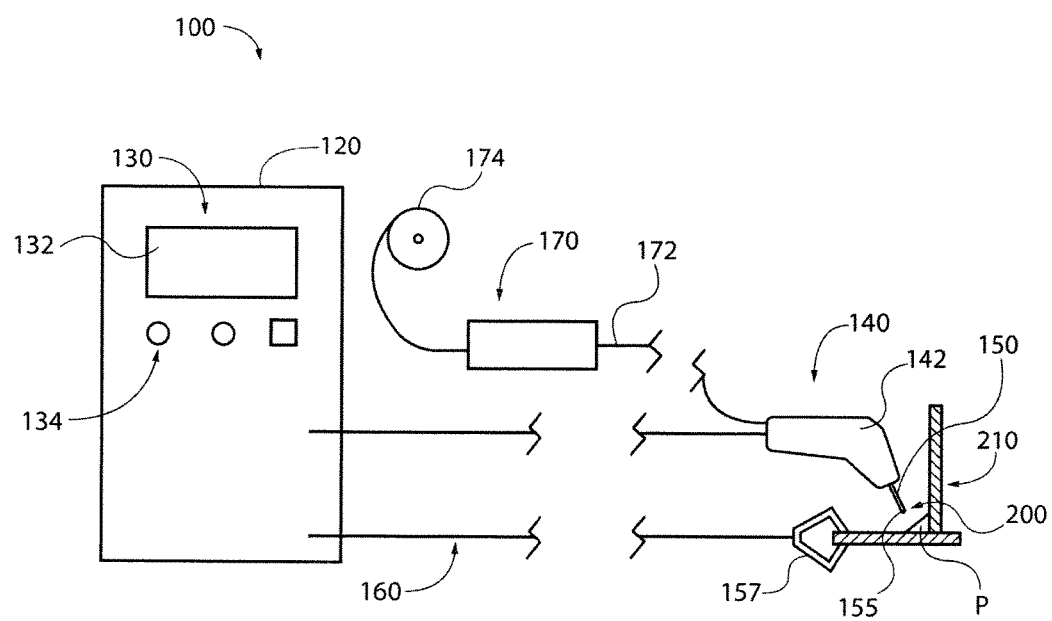
FIG. 1 is a partially schematic view of a welding system according to an embodiment.

With reference to FIG. 1, a welding system 100 according to an embodiment is shown. Welding system 100 generally includes a welding power source 120 that provides an electric current to an implement 140 used to form a weld. Power source 120 may include a controller, generally indicated at 130 having output 132, such as a display screen, LEDs, or other visual, audible, or tactile device for communicating information to a user or another device. Power source 120 may also include an input 134 that receives commands or other information from an outside source. Input may be a connection to another machine, a pendant controller, or onboard controls such as knobs, switches, keypads, and the like. Input from outside sources including the user may be used to select a welding process or tailor settings used in performing a welding operation, or settings related to the particular consumable or welding implement 140.

Welding implement 140 may be a welding torch 142. Power source 120 is electrically connected to an electrode 150 provided by implement 140 including but not limited to a consumable electrode, such as an advancing wire, stick or the like. Power source 120 is further connected to a workpiece 210 by a ground cable clamp 157 or the like to form a weld circuit 160.

Figure 1A:
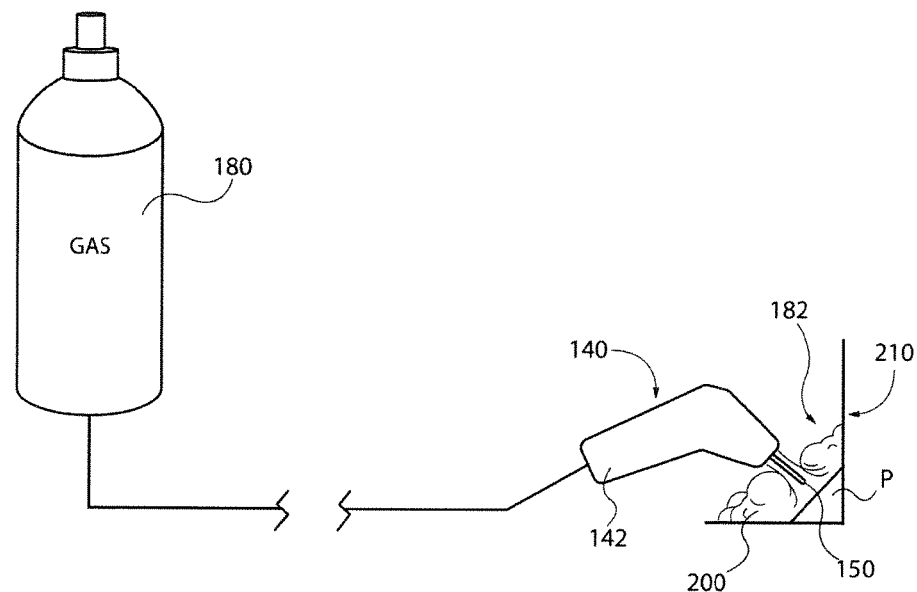
FIG. 1A is a partially schematic view of a welding system according to another embodiment where a gas source is fluidly connected to a torch to provide gas shielding for welding operation.
Figure 1B:
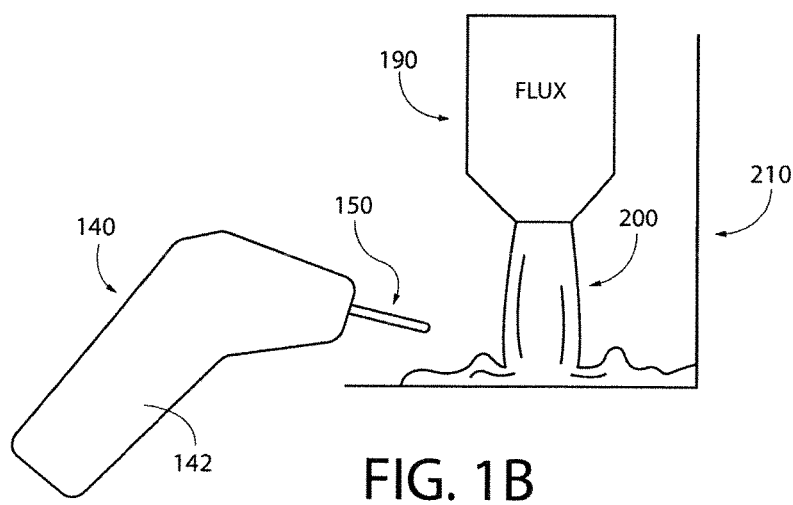
FIG. 1B is a partially schematic view of a welding system according to another embodiment where a flux source is provided.

In the example shown in FIG. 1, a wire feeder, generally indicated at 170 is connected to torch 142 to deliver wire 172 from a wire supply 174, such as a spool, box, or other package, through torch 142 toward workpiece 210. As shown in FIG. 1A, gas source 180 may also be provided and fluidly connected to torch to provide gas shielding for welding operation indicated at 182. FIG. 1B shows yet another embodiment, where a flux source 190 is provided for submerged arc or other welding operations where flux delivery is required. It will be understood that various components from the embodiments shown in the figures may be combined or interchanged as required by a given application.

Figure 2:
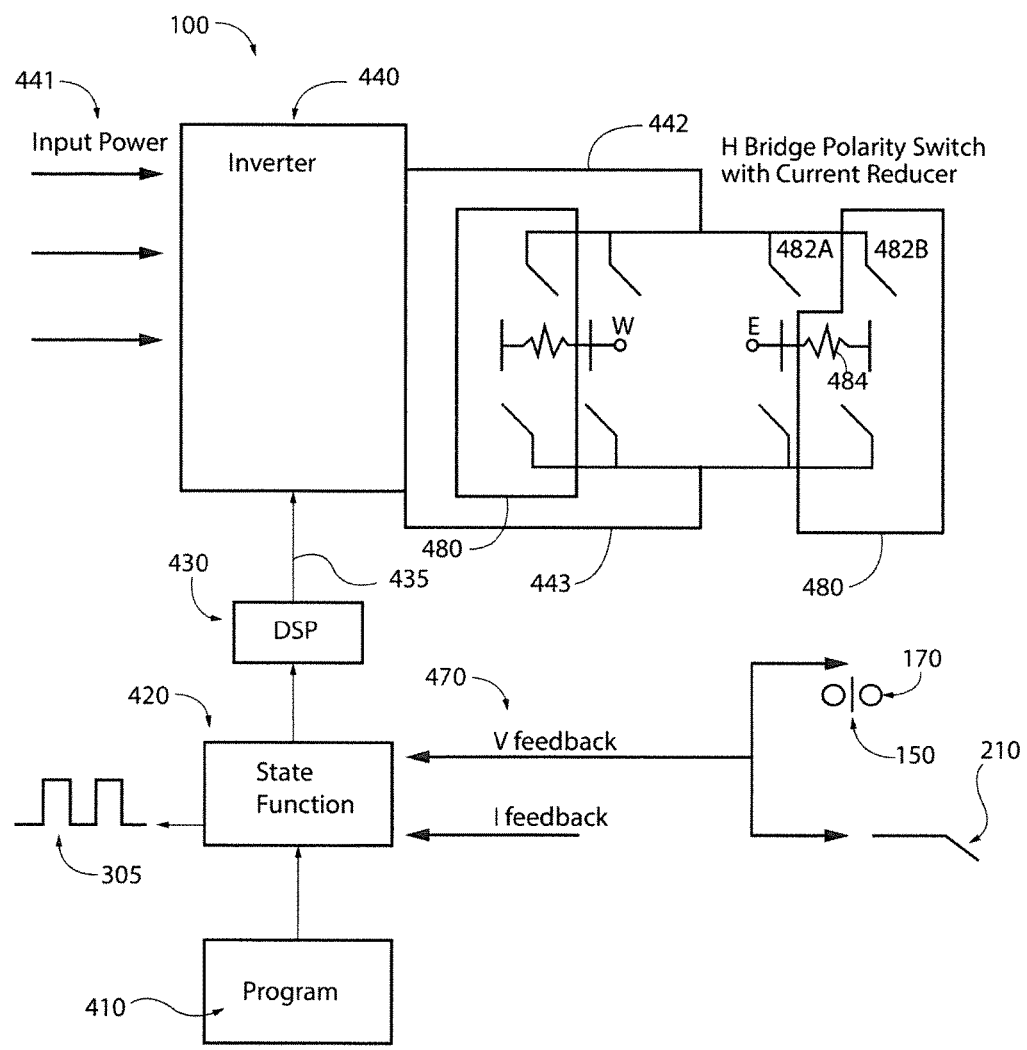
FIG. 2 is a circuit diagram of a welding system according to an embodiment.
Figure 3:
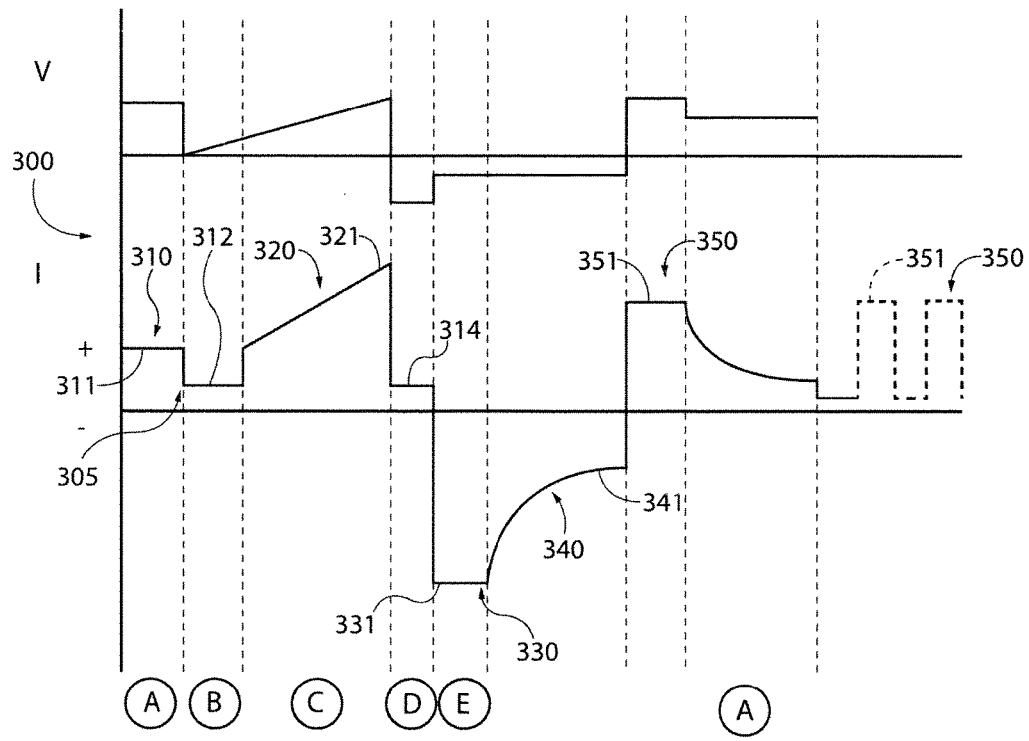
FIG. 3 is an illustration of a cycle of an electric arc welding waveform used in a welding system according to an embodiment.

FIG. 2 is a circuit diagram showing details of a power source 120 according to the invention. An advancing electrode 150 fed toward a workpiece 210 with the electrical connections to power source 120 is schematically shown. One exemplary embodiment of a system 100 for generating the electric welding waveform cycle 300 (FIG. 3). The system 100 is a state machine type of system as is described herein. The Lincoln Electric Power Wave™ 5500 system is an example of a state machine type of welding system.

The system 100 includes a welding program 410 loaded onto a state based function generator 420. In accordance with an embodiment of the present invention, the state based function generator 420 includes a programmable microprocessor device. The welding program 410 includes the software instructions for generating an electric welding waveform 300. The system further includes a digital signal processor (DSP) 430 operationally interfacing to the state based function generator 420. The system also includes a high speed amplifier inverter 440 operationally interfacing to the DSP 430.

The DSP 430 takes its instructions from the state based function generator 420 and controls the high speed amplifier inverter 440. The high speed amplifier inverter 440 transforms a high voltage input power 441 into a low voltage welding output power in accordance with control signals 435 from the DSP 430. For example, in accordance with an embodiment of the present invention, the DSP 430 provides control signals 435 which determine a firing angle (timing of switch activation) for the high speed amplifier inverter 440 to produce various phases of an electric welding waveform.

The outputs 442 and 443 of the high speed amplifier inverter 440 are operationally connected to a welding electrode 150 and a workpiece 210 respectively to provide a welding current which forms an electric arc EA between the electrode 150 and the workpiece 210. The system 100 also includes voltage and current feedback capability 470 which senses a voltage between the electrode 150 and the workpiece 210 and which senses current flowing through the welding circuit formed by the electrode 150, the workpiece 210, and high speed amplifier inverter 440. The sensed current and voltage are used by the state based function generator 420 to detect shorting of the electrode 150 to the workpiece 210 (i.e., a short condition) and to detect when a molten metal ball is about to pinch off from the electrode 150 (i.e., a de-short condition).

The system 100 further includes a current reducer switch 482, described more completely below. The current reducer 480 is operationally connected between the outputs 442 and 443 of the high speed amplifier inverter 440. The current reducer 480 also operationally interfaces to the DSP 430. When a short condition occurs between the electrode 150 and the workpiece 210, the DSP 430 commands the current reducer 480, via a control signal 436, to pull the current level through the welding circuit below a predefined background current level. For example as shown, current reducer 480 may include switches 482A and 482B and resistor 484 that operate with each other to selectively add resistor 484 into the operative circuit to reduce the current to electrode 150. Similarly, when a de-short condition, also referred to as detachment herein, occurs (i.e., a molten metal ball pinches off from the distal end of the electrode 150) the DSP 430 commands the current reducer 480 to pull the current level through the welding circuit below a predefined background current level. Control of the polarity i.e. the application of an electrode positive or electrode negative current may be regulated by a polarity control, generally indicated at 490. For example, polarity controller 490 may include an H bridge polarity switch 492 or other suitable solid state component or programmable controller capable of controlling current polarity.

Figure 4:
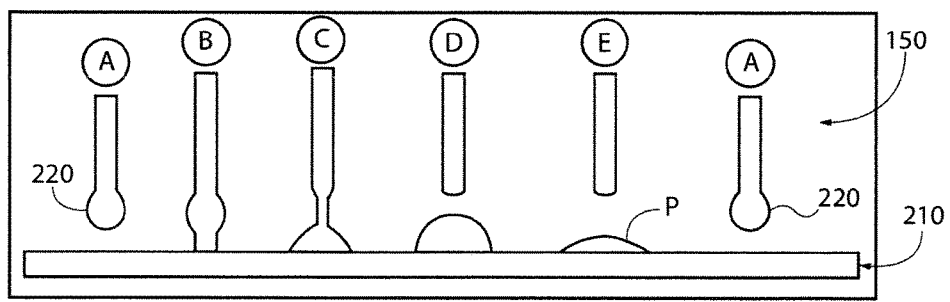
FIG. 4 is an illustration of stages of an arc welding process performed by a welding system according to an embodiment during a cycle depicted in FIG. 3.

FIG. 3 illustrates an exemplary embodiment of a cycle 300 of an electric welding waveform 305 used in an arc welding process 200. FIG. 4 illustrates the various stages (A-E) of the arc welding process over the cycle 300 using the electric welding waveform of FIG. 3, showing the relationship between a welding electrode 150 and a metal workpiece 210. During an arc welding process, welding system 100 provides an electrical current in a selected waveform 305 to produce the electric arc pulses. In general, the cycle 300 periodically repeats during the arc welding process to produce the resultant weld. However, the cycle 300 may repeat without the same number of pulses and possibly without certain phases within the cycle 300 as described more completely below.

The cycle 300 of the electric welding waveform 305 includes a positive polarity background current phase 310 providing a positive polarity background current level 311, a positive pinch current phase 320 providing a monotonically increasing pinch current level 321, a negative polarity peak current phase 330 providing a negative polarity peak current level 331, and a negative tail-out current phase 340 providing a decreasing tail-out current level 341.

During the positive polarity background current phase 310, an electric arc EA is sustained between the electrode 150 and the workpiece 210 producing a molten metal ball 220 on a distal end 155 of the electrode 150 (see stage A in FIG. 4). At stage B, the molten metal ball 220, still connected to the electrode 150, shorts to the workpiece 210. When the short occurs, the arc EA is extinguished and the current level of the waveform 305 is dropped below the background current level 311 to a current level 312, allowing the molten ball 220 to wet into a puddle on the work piece 210. According to an embodiment depicted in FIG. 3, upon shorting and detachment of molten metal ball 220, welding system 100 provides an electrode negative current to electrode 150.

During the positive polarity pinch current phase 320, the current level of the waveform 305 is increased monotonically (e.g., ramped upward) above the background current level 311, providing the increasing pinch current level 321 which causes the shorted molten metal ball 220 to begin to pinch off from the distal end of the electrode 150 into the puddle of the work piece 210 as shown in stage C of FIG. 4. As the molten metal ball 220 is about to pinch off from the electrode 150, the current level of the waveform 305 is again dropped below the background current level 311 to a current level 314 to avoid spatter, and an arc EA is re-established between the electrode 150 and the workpiece 210.

Once the arc EA is re-established, the waveform 305 enters the negative polarity peak current phase 330. During the negative polarity peak current phase 330, the current level of the waveform 305 is increased to and held at the negative polarity peak current level 331. In accordance with an embodiment, the peak current level 331 is typically the highest current level of the waveform 305 and establishes an arc EA between the electrode 150 and the workpiece 210 of sufficient strength to begin forming a next molten metal ball 220 at the distal end of the electrode 150.

After the negative polarity peak current phase 330, the waveform 305 enters the negative polarity tail-out current phase 340. During the negative polarity tail-out current phase 340, the current level of the waveform 305 decreases toward the negative background current level 341 providing the decreasing tail-out current level. In the example shown, the tail out decrease is performed exponentially (FIG. 3). The current of the waveform 305 inputs heat into the weld.

After the negative background current 341, the positive polarity portion entered, providing the positive polarity current. During the positive polarity portion, at least one heat-increasing current pulse is generated, providing an intermediate current level 351 whose amplitude is between the background current level 311 and the negative polarity peak current level 331. The heat increasing current pulse may be periodically repeated within the positive polarity portion until a next short between the molten metal ball 220 and the workpiece 210 occurs, at which time the arc EA is extinguished and the current level of the waveform 305 is dropped below the background current level 311 to a current level 312, allowing the next molten ball 220 to wet into the puddle on the workpiece 210 (stage B).

The heat-increasing current pulses 350 serve to re-heat the puddle and surrounding area to increase penetration. Such an increase in heat provided by the heat-increasing current pulses 350 may be desired in, for example, the welding of an open root joint in order to provide better penetration without increasing the fluidity of the puddle. The heat increasing pulses are not so large in amplitude as to transfer droplets across the arc and are not so wide in pulse width as to force the welding system above the short arc transition into globular transfer. Again, in general, the cycle 300 periodically repeats during the arc welding process to produce the resultant weld. However, the cycle 300 may repeat without the same number of heat increasing pulses 350 and possibly without the pinch current phase 320 if a short does not occur.

According to an embodiment, wave form 305 is used to perform a surface tension transfer process (STT) where the molten droplet is formed on the end of electrode 150 and wets into a workpiece 210 or weld puddle. In other embodiments, the STT process is not relied on to pull the bead and the bead is ejected from the distal end by the electromagnetic forces created at the electric arc EA. The embodiments described herein may be used in any welding process including MIG/MAG, GMAW, SMAW, FCMAW and the like.

With reference to FIG. 3, power source 120 provides positive polarity background current 311 during the positive polarity background phase 310. With reference to FIG. 2, a wet in phase includes opening a switch 482, described more completely below, to increase resistance and decrease the current to droplet. The droplet wets in to the workpiece or a weld puddle formed by previous droplets. The amperage of the wet in phase is generally lower than background current and varies depending on the particular hardware i.e. workpiece material, electrode material and power source. In the example shown, wet in amperage is in a range of about 20 amps to about 40 amps. The duration of the wet in phase may vary to allow sufficient time for the droplet to wet in to the puddle or workpiece. Following wet in, switch is closed to reduce the resistance and raise the current level stepwise to begin the pinch phase. As discussed, pinch phase includes ramping up the current to pinch off the molten droplet and eject it from the distal end of electrode 150.

As an example, in accordance with an embodiment of the present invention, the arc welding process is a gas metal arc welding (GMAW) process using argon and carbon dioxide as shielding gases applied in an STT process. The background current level 311 is about 70 amps, the peak current level 331 is about 330 amps, and the intermediate current level 351 is about 210 amps. The pulse width of a single heat-increasing pulse 350 is about 1 millisecond and may be repeated about every 3 milliseconds, up to three to six pulses during the background current phase 310. The period of the cycle 300 is about 15 milliseconds.

Figure 6:
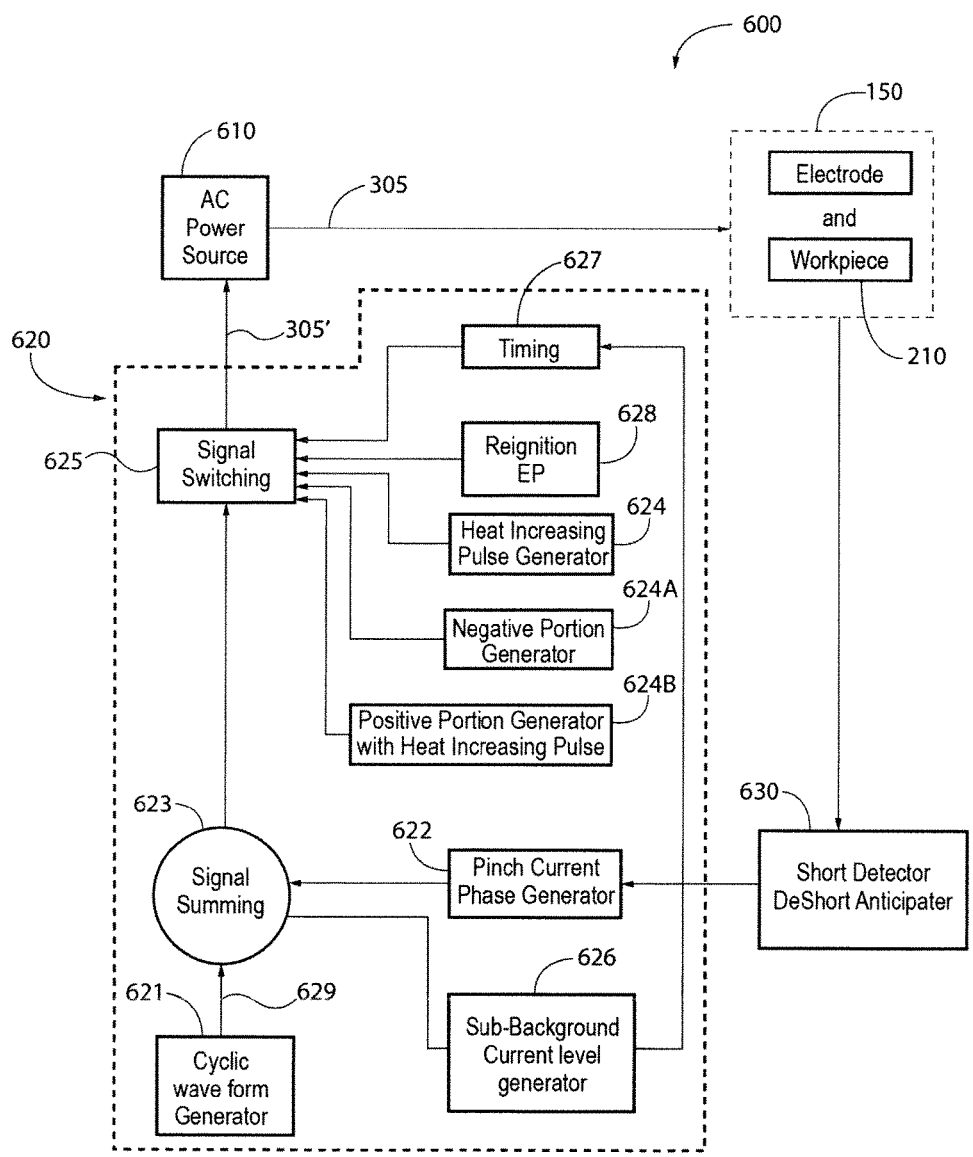
FIG. 6 is a functional block diagram depicting a welding system according to an embodiment.

FIG. 6 illustrates a functional block diagram of a first exemplary embodiment of a system 600 for generating the electric welding waveform 305 of FIG. 1. The system 600 provides power generation capability through an alternating current power source 610 and modulating waveform generation and shaping capability 620 to create a modulating waveform 305'. The system 600 also provides short detection and premonition detection (de-short anticipation) capability at a short detector/de-short anticipator 630 to detect when a short condition occurs between the electrode 150 and the workpiece 610 and to anticipate when a short condition is about to terminate (de-short condition) as a molten metal ball (e.g., 220) pinches off into the puddle on the workpiece 210.

A modulating waveform 305' generated by the modulating waveform generation and shaping capability 620 is used to modulate the power generation capability 610 which provides electric current to the electrode 150 and workpiece 210 in the form of the electric welding waveform 305. The modulating waveform generation and shaping capability 620 includes a periodic base waveform generation capability 621. FIGS. 3 and 4 illustrate exemplary embodiments of portions of the modulating waveform 305' as generated by the various capabilities of the system 600 of FIG. 6. FIG. 3 illustrates a periodic base waveform cycle 300 generated by the periodic base waveform generation capability 621. The periodic base waveform generation capability 621 provides the generation of the background current phase 310, peak current phase 330, and tail-out current phase 340 of the modulating waveform 305' in a periodic manner.

The modulating waveform generation and shaping capability 620 also includes a pinch current phase generation capability 622. FIG. 3 illustrates the periodic base waveform portion 300 having the pinch current phase 320. In accordance with an embodiment of the present invention, the pinch current phase 320 may be summed with the periodic base waveform portion 300 using a signal summing capability 623 of the modulating waveform generation and shaping capability 620.

The modulating waveform generation and shaping capability 620 includes a negative polarity portion with peak, tailout, and background current generation capability 624A. FIG. 3 illustrates the periodic negative polarity portion having peak 330, tailout 340, and background at level 341.

The modulating waveform generation and shaping capability 620 further includes a positive polarity portion with positive peak, tailout, and background phases, referred to as heat-increasing pulse generation capability, 624B. FIG. 3 further illustrates the periodic positive polarity portion having the heat-increasing pulses 350 switched in after the negative polarity portion. In accordance with an embodiment of the present invention, the heat-increasing current pulses 350 may be switched in during the background current phase 310 using a signal switching capability 625 of the modulating waveform generation and shaping capability 620.

The modulating waveform generation and shaping capability 620 also includes a sub-background current level generation (current reducing) capability 626. FIG. 3 illustrates the periodic base waveform having a sub-background current wet in portion 312. Another sub-background current portion may occur upon detecting The resultant modulating waveform 305' is used to modulate the power generation capability 610 to provide the actual current levels (311, 312, 314, 321, 331, 341, 351) of the various portions of the electric welding waveform 305 to the electrode 150 and the workpiece 210 as shown in FIG. 1 and FIG. 2. As used herein, the term "current level" refers to a current amplitude which is substantially steady but may have some variations due to the somewhat in-exact nature of producing an electric welding waveform.

During a welding process using the system 600, the short detection and de-short anticipation capability 630 monitors current and voltage at the electrode 150 and the workpiece 210 and detects when a short condition occurs between the electrode 150 and the workpiece 210 and also anticipates when the short condition is about to terminate (de-short condition). When a short condition occurs, the sub-background current level capability 626 immediately pulls the current level of the waveform 305 below the background current level 311 to a current level 312, in response to the short condition being detected, allowing a molten metal ball to wet into a puddle on the workpiece 210 as described previously herein. Then the pinch current phase generation capability 622 applies the monotonically increasing pinch current level 621 to the waveform 305.

When a de-short condition is anticipated (i.e., the molten metal ball is about to pinch off from the distal end of the electrode), the sub-background current level capability 626 again pulls the current level of the waveform 305 below the background current level 311 to the current level 314, in response to the de-short condition being anticipated, in order to avoid spatter. According to an embodiment, re-ignition capability 628 provides an electrode positive current level 314 to reignite the electric arc with more stability and less spatter.

Furthermore, a timing capability 627 of the waveform generation and shaping capability 620 is triggered. The timing capability 627 counts down over the time segments occupied by the negative peak current phase 330 and the tail-out current phase 340 until the waveform 305 switches to the positive polarity portion beginning at positive peak current phase 350.

In accordance with an embodiment of the present invention, the timing capability 627 is pre-programmed with the amount of time occurring between the de-short condition, entrance into the negative portion, and the subsequent amount of time prior to entering the positive polarity portion. Once the timing capability 627 finishes counting down, indicating that the positive polarity background current phase 310 has been entered, the signal switching capability 625 is triggered to repeat the positive polarity portion of waveform 305 until a next short condition is detected. The pulse amplitude and duration may be pre-selected or tailored depending on the type of workpiece or electrode material. In the example shown, pulses are applied at a rate of about 333 Hz with a wire feed speed of about 150 inches per minute in connection with a steel workpiece having a thickness of about 0.045 inches. Optionally, for thin-walled workpieces or workpiece materials that may be more sensitive to heat input, such as aluminum or, greater control of heat input may be obtained by switching to an electrode negative heat increasing pulse.

The various functional capabilities of the system 600 of FIG. 6 may be implemented using configurations of electronic components which may include analog and/or digital electronic components. Such configurations of electronic components may include, for example, pulse generators, timers, counters, rectifiers, transistors, inverters, oscillators, switches, transformers, wave shapers, amplifiers, state machines, digital signal processors, microprocessors, and microcontrollers. Portions of such configurations may be programmable in order to provide flexibility in implementation. Various examples of such configurations of electronic components may be found in U.S. Pat. No. 4,972,064, U.S. Pat. No. 6,051,810, U.S. Pat. No. 6,498,321, and U.S. patent application Ser. No. 11/861,379, each of which is incorporated herein by reference in its entirety.

In accordance with an embodiment of the present invention, the system 600 includes a first configuration of electronic components to generate the background current phase 310, the peak current phase 330, and the tail-out current phase 340 of the electric welding waveform 305. The system 600 further includes a second configuration of electronic components to generate the pinch current phase 320 of the electric welding waveform 305. The system 600 further includes a third configuration of electronic components to reignite the electric arc with an electrode positive current. The system 600 also includes a fourth configuration of electronic components to generate at least one heat-increasing current pulse 350 of the electric welding waveform 305 during the background current phase 310.

In accordance with an embodiment of the present invention, the system 600 also includes a fifth configuration of electronic components to decrease the current level of the electric welding waveform 305 below the background current level at an end of the background current phase 310 in response to the electrode shorting to the workpiece allowing the droplet to wet in to the workpiece 210 or a weld puddle 220. The system 200 further includes a similar configuration of electronic components to decrease the current level of the electric welding waveform 305 below the background current level at an end of the pinch current phase 320 in anticipation of the droplet detaching from the electrode 150.

The first through fifth configurations of electronic components may not necessarily be independent of each other but may share certain electronic components. For example, in accordance with an embodiment of the present invention, many of the electronic components of the first configuration may be the same as many of the electronic components of the third configuration. Similarly, many of the electronic components of the fourth configuration may be the same as many of the electronic components of the fifth configuration. Other shared components may be possible as well, in accordance with various embodiments of the present invention.

The functional implementation shown in FIG. 6 illustrates one exemplary embodiment. Other embodiments are possible as well. For example, in accordance with another embodiment, the pinch current phase 320 may be switched into the modulating waveform 305' via signal switching capability 625, instead of being summed in via signal summing capability 623. Similarly, the heat-increasing pulses 350 may be summed into the modulating waveform 305' via signal summing capability 623, instead of being switched in via signal switching capability 625. Other modified embodiments are possible as well, which result in generating the electric welding waveform 305 of FIG. 1 or similar waveforms having at least one heat-increasing current pulse during a background current phase.

Figure 5:
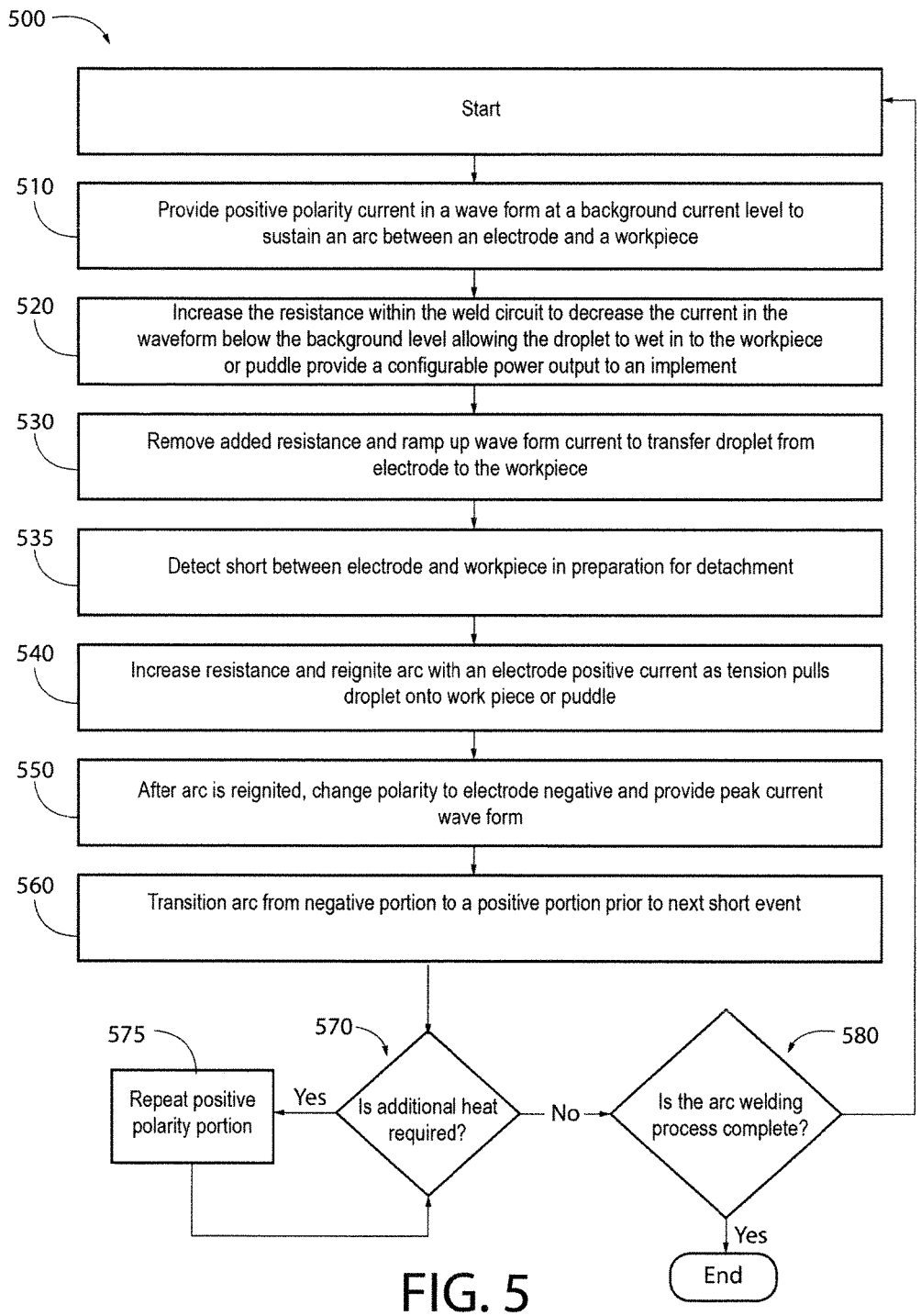
FIG. 5 is a flow chart depicting operation of a welding system according to an embodiment.

FIG. 5 illustrates a flowchart of a first exemplary embodiment of a method 500 of performing an alternating current arc welding process using the components and capability of system 100 and a wave form such as the one depicted in FIG. 3. In step 510, a positive polarity current is provided and regulated to a background current level 311 to sustain an electric arc EA between an electrode 150 and a workpiece 210, producing a molten metal ball 220 on a distal end 155 of electrode 150. In step 520, the current is dropped below background current level 311, for example by adding resistance to the weld circuit, in response to the molten metal ball 220 shorting to the workpiece 210 and extinguishing the electric arc EA. The drop in current level is maintained to allow the molten metal ball 220 to wet into a puddle on the workpiece 210. In step 530, automatically increase the output current level above the background current level 311 to induce the molten metal ball 220 to pinch off from the distal end 155 of the electrode 150. As discussed, the increase may be performed as a linear function to ramp up the current until detachment is anticipated at 535.

In step 540, decrease the output current level below the background current level 311 as the molten metal ball 220 pinches off from the distal end of the electrode 150 onto the workpiece 210, reigniting an electric arc EA between the electrode 150 and the workpiece 210 with an electrode positive current. In step 550, change the polarity to electrode negative and increase the output current level to a peak current level 331 of the waveform 305 in response to re-establishing an electric arc EA. In step 560, transition to the positive polarity portion, producing a next molten metal ball 220 on the distal end 155 of the electrode 150. In step 570, if additional heat is required, step 575 is performed to apply a heat increasing pulse at an intermediate current level 351 being between the background current level 311 and the peak current level 331, at a pre-defined pulse rate as needed, until a next short is established between the next molten metal ball 220. In step 580, if the arc welding process is not completed, then proceed back to step 520, otherwise, end.

Figure 7:
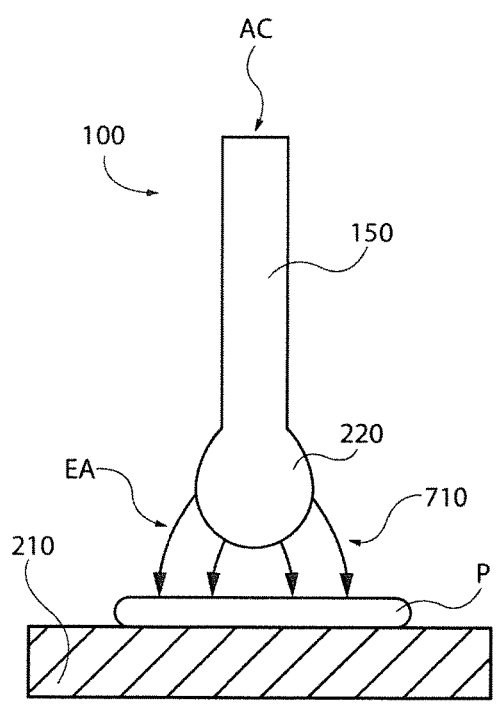
FIG. 7 is a partially schematic illustration of an electrode according to an embodiment depicting details of a jet force created by an electron flow from the electrode toward a weld puddle on a workpiece created with an alternating current source wave form.
Figure 8:
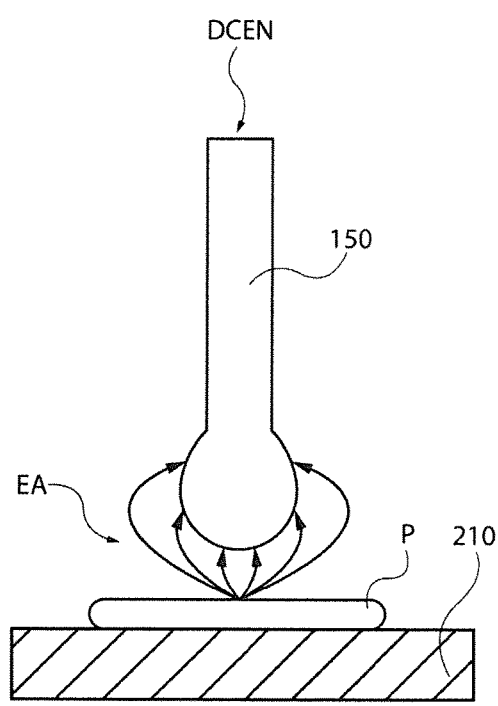
FIG. 8 is a partially schematic illustration of an electrode similar to FIG. 7. depicting electron flow from an electrode using a direct current source.

According to the embodiments described above, providing an alternating current source in a wave form 305 creates an electric arc EA having an electron flow as depicted in FIG. 7. In this way, system 100 applies a jet force 710, indicated by arrows, corresponding to electron flow that is diffuse relative to the electrode 150. As shown, electron flow from electrode 150 radiates downward from electrode 150 and molten droplet 220 in radial arcs that contact the workpiece at progressively increasing distances from a center of the electrode. In this way, the system 100 applies the jet force 710 to the underlying weld puddle P during arcing phases and a more evenly distributed outward force to the molten droplet 220 as it detaches from electrode 150. The jet force 710 pushes the molten metal droplet 220 into the puddle P and forces the puddle P outward from electrode with an even force distribution resulting in a better bead shape when the molten weld material hardens. The more stable electron flow pattern and resulting jet force further reduces the likelihood of spatter by applying more even forces as the droplet detaches and is transferred to the puddle P and also by reducing the instabilities that may cause the tail of a droplet to explode during re-ignition of the arc. In contrast, applying a direct current (DC) with the same wave form 305 results in a focused electron flow and concentrated force as depicted in FIG. 8. The forces created repel the droplet and may be uneven or unstable such that the resulting weld puddle P is irregular or does not have a desirable shape when hardened. Practically speaking defects in the bead appearance may require subsequent machining or if the bead is ineffective, the weld may need to be redone.

In summary, a first embodiment of the present welding system welding system comprises a welding power source that provides an alternating current in a selected wave form having a set of positive and negative portions, the negative portion consisting of a peak, tailout, and background phase, and the positive portion consisting of a peak, tailout, and background; wherein the power source provides an upward ramping current during the pinch and detachment phase, switches to an electrode negative current during the negative peak, tailout, and background phases, and switches to a subsequent electrode positive portion; wherein, the positive portion may repeat prior to the next shorting event.

According to another embodiment of the system, the wave form is a surface tension transfer wave form.

According to another embodiment of the system, the wave form is a GMAW wave form.

According to another embodiment of the system, the welding power source includes a waveform generator adapted to provide the selected wave form, wherein the wave form generator is adapted to detect an end of a short circuit (i.e. necking) condition based on at least one of dv/dt, impedance, or timer based on a predictive model, wherein the power source switches to the electrode negative current upon detection of the end of the short circuit.

According to another embodiment of the system, the welding power source provides the ramping current as electrode positive.

According to another embodiment of the system, the wave form includes a detachment phase, and wherein the welding power source reignites an arc during the detachment phase with an electrode positive current. According to a further embodiment of the system, after the detachment phase, the wave form switches to an electrode negative current adapted to produce a jet force adapted to push to push a distal end of the electrode away from a weld puddle.

According to another embodiment of the system, the wave form further includes a background phase and wet in phase before the pinch phase, wherein the background phase and wet in phase are electrode positive, the background phase being at a higher amperage than the wet in phase.

According to another embodiment of the system, the welding power source provides a current from about 20 amps to about 40 amps during the wet in phase.

According to another embodiment of the system, during the background phase, the welding power source provides a background current in the range of about 50 to 75 amps.

According to another embodiment of the system, during the peak current phase, the welding power source provides a current in the range of about 100 to 250 amps.

According to another embodiment of the system, each of the one or more pulses has a duration in the range of about 0.5 to 2 milliseconds.

According to another embodiment of the system, the negative polarity portion occurs after the pinch phase and is separated from the pinch phase by a detachment phase.

According to another embodiment of the system, the negative tailout phase includes progressively decreasing electrode negative current.

According to another embodiment of the system, the welder power source includes a controller in communication with a state function generator, a digital signal processor in communication with the state function generator, an inverter in communication with the digital signal processor, wherein the inverter is electrically connected to a power source, a switching circuit and a current reducer.

According to a further embodiment of the system, the switching circuit is an H-bridge polarity switch.

According to another further embodiment of the system, the state function generator is electrically connected to at least one of the torch and the workpiece to receive voltage or current feedback therefrom.

Another embodiment of the present welding system comprises a welding power source adapted to provide an alternating current in a selected wave form to an electrode; wherein the electrode is consumable and wherein the wave form includes one or more phases during which the electrode produces a molten droplet at an exposed end thereof, wherein a short between the electrode and the workpiece occurs as the molten droplet detaches from the electrode; the welding power source being adapted to detect the detachment of the short and provide an electrode negative peak current to the electrode following transfer of the molten droplet to the workpiece; the welding power source being adapted to switch the current from electrode positive to electrode negative after transfer of the molten droplet; wherein the welding power source generates a jet force that pushes a puddle P formed by the molten droplet toward the workpiece.

According to another embodiment, the wave form is a surface tension transfer wave form.

In accordance with an embodiment of the present invention, the arc welding process may be a gas metal arc welding (GMAW) process using, for example, argon and $CO_2$ as shielding gases, or $CO_2$ by itself. The welding electrode may include steel or stainless steel. In accordance with an embodiment of the present invention, the background current level may be about 70 amps, the peak current level may be about 330 amps, and the intermediate current level may be about 210 amps. In accordance with an embodiment of the present invention, the pre-defined pulse rate of the heat-increasing current pulses may be about 333 Hz and a wire feed speed of the arc welding process may be about 150 inches per minute.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A welding system comprising:
a welding power source that provides an alternating current in a selected wave form having a positive polarity pinch phase and a positive polarity detachment phase, a negative polarity portion including a negative peak current phase, a negative tail out phase, a negative background phase, and a subsequent positive polarity portion including a positive peak current phase, a positive tail out current phase, and a positive background phase; wherein the power source provides an upward ramping current during the positive polarity pinch phase,
wherein the welding power source reignites an arc during the positive polarity detachment phase with a positive polarity current level that is lower than the positive background phase, and
wherein the wave form switches directly from the positive polarity detachment phase to the negative peak current phase while the arc is ignited so as to push a distal end of an electrode away from a weld puddle.

2. The welding system of claim 1, wherein the wave form is a surface tension transfer wave form.

3. The welding system of claim 1, wherein the wave form further includes another background phase and wet in phase before the positive polarity pinch phase, wherein the another background phase and wet in phase are electrode positive, the another background phase being at a higher amperage than the wet in phase.

4. The welding system of claim 3, wherein the welding power source provides a current from about 20 amps to about 40 amps during the wet in phase.

5. The welding system of claim 1, wherein during the positive background phase, the welding power source provides a background current in the range of about 20 to 100 amps.

6. The welding system of claim 1, wherein during the negative peak current phase, the welding power source provides a current in the range of about 150 to 350 amps.

7. The welding system of claim 1 wherein the welder power source includes a controller in communication with a state function generator, a digital signal processor in communication with the state function generator, an inverter in communication with the digital signal processor, wherein the inverter is electrically connected to a power source, a polarity switching circuit and a current reducer.

8. The welding system of claim 7, wherein the switching circuit is an H-bridge polarity switch.

9. The welding system of claim 7, wherein the state function generator is electrically connected to at least one of a torch and a workpiece to receive voltage or current feedback therefrom.

10. A welding system comprising:
a welding torch;
a wire feeder connected to the welding torch to deliver a welding electrode to the welding torch;
a welding power source that provides a periodic, alternating current welding waveform between the welding electrode and a workpiece, wherein the periodic, alternating current welding waveform includes:
a positive polarity background current portion;
an upward ramping positive polarity pinch current portion during a short circuit condition of the welding electrode to a weld puddle;
a positive polarity detachment phase directly following the pinch current portion, wherein the positive polarity detachment phase has a current level that is lower than the positive polarity background current portion, and wherein the welding power source reignites an arc between the welding electrode and the workpiece during the positive polarity detachment phase;
a negative polarity peak current phase, wherein the welding waveform switches directly from the positive polarity detachment phase to the negative polarity peak current phase while the arc is ignited so as to push a distal end of an electrode away from the weld puddle;
a negative polarity tail out phase and a negative polarity background phase following the negative polarity peak current phase; and
a further positive polarity portion following the negative polarity background phase.

11. The welding system of claim 10, wherein the welding waveform only switches from positive polarity to negative polarity during a reignition of the arc at the current level that is lower than the positive polarity background current portion immediately following detachment of a molten droplet into the weld puddle.

12. The welding system of claim 1, wherein the wave form only switches from positive polarity to negative polarity during a reignition of the arc at the positive polarity current level that is lower than the positive background phase immediately following detachment of a molten droplet into the weld puddle.

* * * * *